(12) United States Patent
Ramirez

(10) Patent No.: US 9,578,275 B2
(45) Date of Patent: Feb. 21, 2017

(54) PERSONAL VEHICLE VIDEO RECORDING DEVICE

(71) Applicant: Samuel R. Ramirez, San Marcos, TX (US)

(72) Inventor: Samuel R. Ramirez, San Marcos, TX (US)

( * ) Notice: Subject to any disclaimer, the term of this patent is extended or adjusted under 35 U.S.C. 154(b) by 143 days.

(21) Appl. No.: 14/464,468

(22) Filed: Aug. 20, 2014

(65) Prior Publication Data

US 2016/0057377 A1    Feb. 25, 2016

(51) Int. Cl.
*H04N 5/77*   (2006.01)
*B60R 11/04*  (2006.01)
*G07C 5/08*   (2006.01)
*B60R 11/00*  (2006.01)

(52) U.S. Cl.
CPC ............ *H04N 5/77* (2013.01); *B60R 11/04* (2013.01); *G07C 5/0891* (2013.01); *B60R 2011/0003* (2013.01); *B60R 2011/0033* (2013.01)

(58) Field of Classification Search
CPC .......... G11B 27/105; G11B 2220/2541; H04N 5/77; H04N 13/0048; H04N 13/0055
USPC ......................................... 386/223
See application file for complete search history.

(56) References Cited

U.S. PATENT DOCUMENTS

| | | | |
|---|---|---|---|
| 5,886,420 A * | 3/1999 | Regalado | B60R 25/04 123/146.5 B |
| D624,106 S | 9/2010 | Cho et al. | |
| D677,594 S | 3/2013 | Brown et al. | |
| 8,462,204 B2 | 6/2013 | Schofield et al. | |
| 8,480,315 B2 | 7/2013 | Nakamura et al. | |
| 8,508,384 B2 | 8/2013 | Uken et al. | |
| 9,132,805 B1 * | 9/2015 | King | B60R 25/04 |
| 2003/0081127 A1 * | 5/2003 | Kirmuss | B60R 11/02 348/207.99 |
| 2003/0103142 A1 | 6/2003 | Hitomi et al. | |
| 2005/0265711 A1 * | 12/2005 | Heibel | B60R 11/04 396/419 |
| 2007/0024711 A1 | 2/2007 | Luna | |
| 2008/0277540 A1 * | 11/2008 | Heibel | F16M 11/02 248/187.1 |
| 2009/0066792 A1 * | 3/2009 | Issa | G07C 5/0891 348/148 |
| 2012/0154587 A1 | 6/2012 | Hwang | |
| 2013/0245881 A1 * | 9/2013 | Scarbrough | G07C 5/0891 701/36 |

FOREIGN PATENT DOCUMENTS

| | | |
|---|---|---|
| CN | 202782967 | 3/2013 |
| DE | 19816054 | 2/2007 |

* cited by examiner

*Primary Examiner* — William Tran

(57) ABSTRACT

A personal vehicle video recording device records video in and around a personal vehicle to preserve a visual record of an encounter with law enforcement. The device includes a video storage unit coupled to a personal vehicle and a plurality of cameras. Each of the cameras is positioned to monitor a respective zone relative to the personal vehicle. Each of a plurality of wires couples an associated one of the cameras to the video storage unit. An activation mechanism is operationally coupled to the video storage unit such that the video storage unit records and stores video images from the cameras upon manipulation of the activation mechanism.

2 Claims, 3 Drawing Sheets

PERSONAL VEHICLE VIDEO RECORDING DEVICE

BACKGROUND OF THE DISCLOSURE

Field of the Disclosure

The disclosure relates to video recording devices and more particularly pertains to a new video recording device for recording video in and around a personal vehicle to preserve a visual record of an encounter with law enforcement.

SUMMARY OF THE DISCLOSURE

An embodiment of the disclosure meets the needs presented above by generally comprising a video storage unit coupled to a personal vehicle and a plurality of cameras. Each of the cameras is positioned to monitor a respective zone relative to the personal vehicle. Each of a plurality of wires couples an associated one of the cameras to the video storage unit. An activation mechanism is operationally coupled to the video storage unit such that the video storage unit records and stores video images from the cameras upon manipulation of the activation mechanism.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
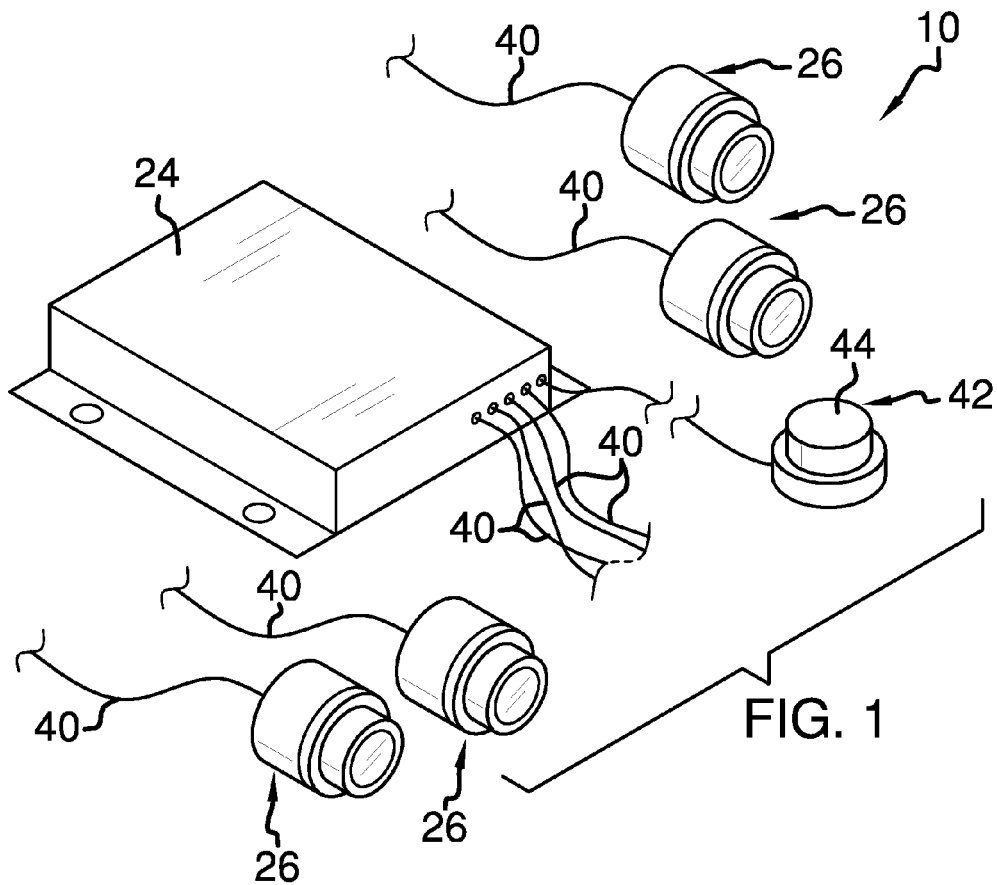
FIG. 1 is a top front side perspective view of a personal vehicle video recording device according to an embodiment of the disclosure.
Figure 2:
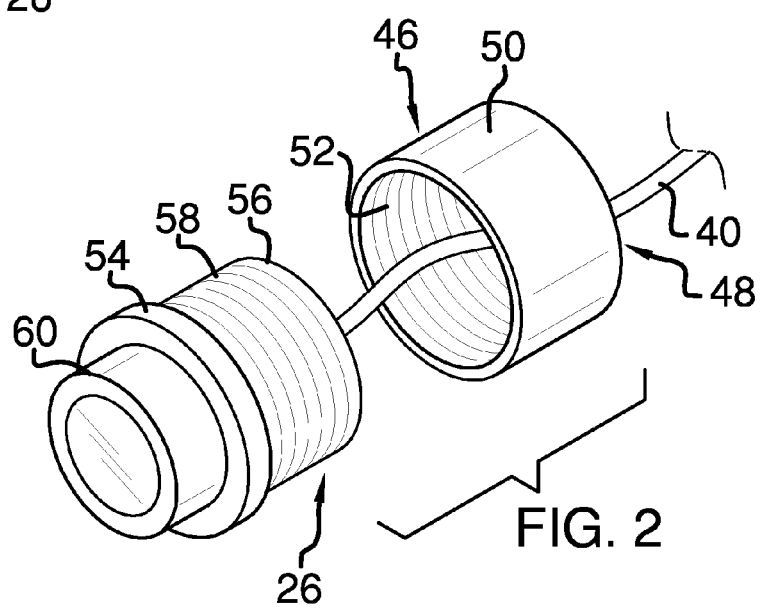
FIG. 2 is a partially exploded view of a camera of an embodiment of the disclosure.
Figure 3:
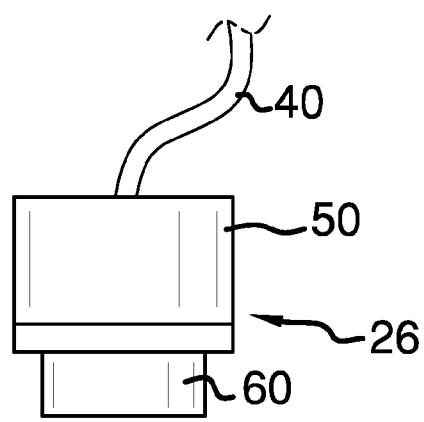
FIG. 3 is a top view of a camera of an embodiment of the disclosure.
Figure 4:
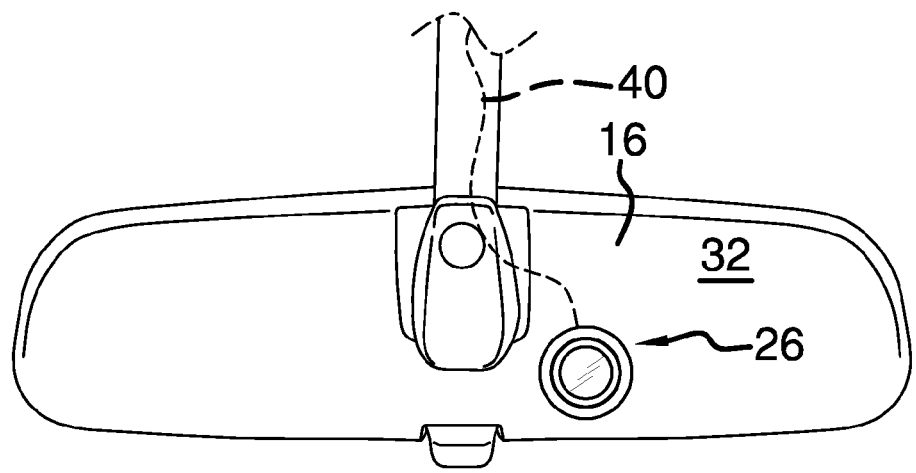
FIG. 4 is a front view of a camera of an embodiment of the disclosure installed in a personal vehicle.
Figure 5:
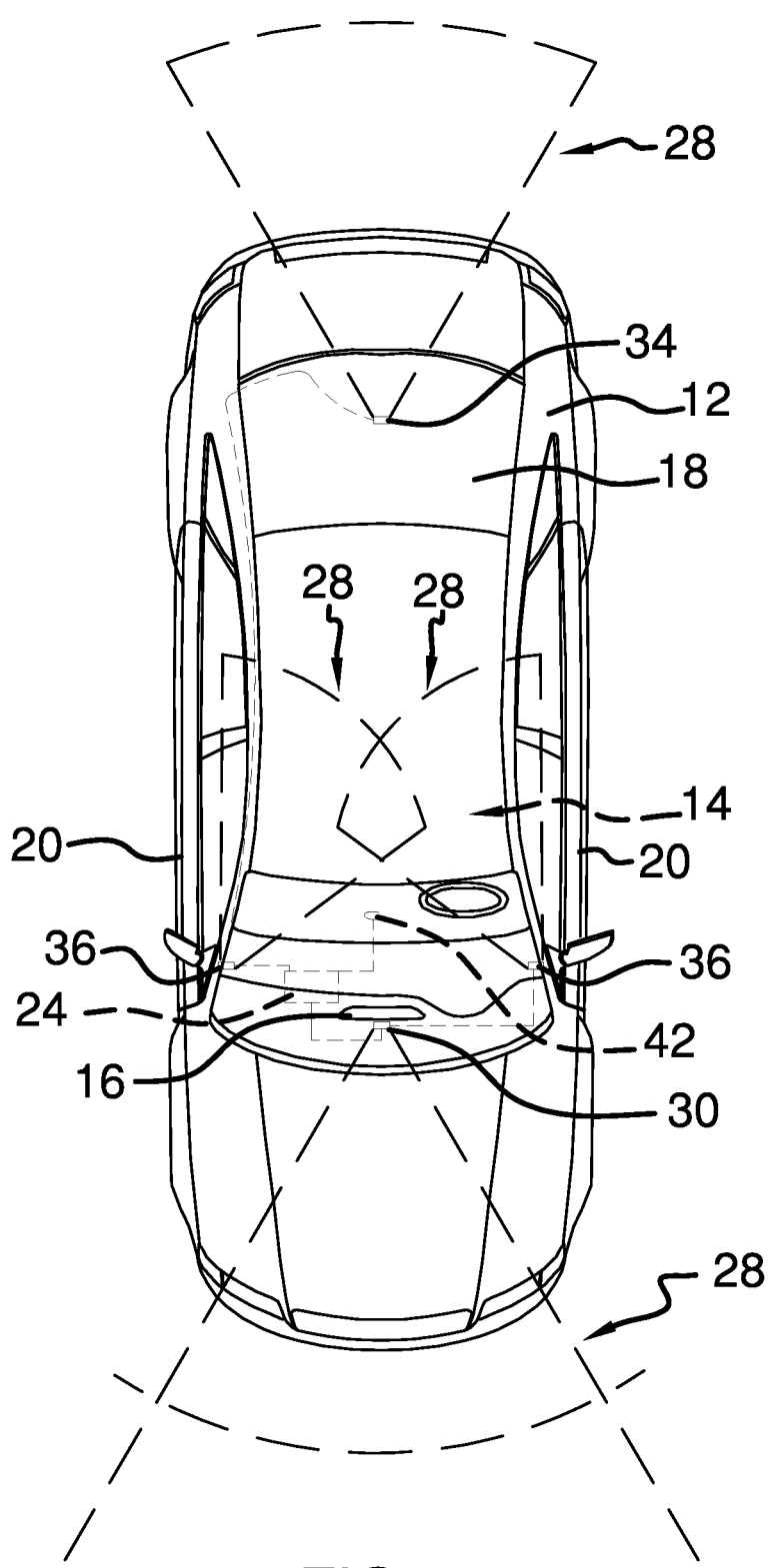
FIG. 5 is a top view of an embodiment of the disclosure in use.

With reference now to the drawings, and in particular to FIGS. 1 through 5 thereof, a new video recording device embodying the principles and concepts of an embodiment of the disclosure and generally designated by the reference numeral 10 will be described.

As best illustrated in FIGS. 1 through 5, the personal vehicle video recording device 10 generally comprises a personal vehicle 12 having an interior 14, a rear view mirror 16, a rear window 18, and a pair of doors 20. Each of the doors 20 is positioned on an associated side 22 of the personal vehicle 12. A video storage unit 24 is coupled to the personal vehicle 12 such that the video storage unit 24 is concealed from being viewed when looking into the interior 14 of the personal vehicle 12. Each of a plurality of cameras 26 is coupled to the personal vehicle 12. Each camera 26 is positioned to monitor a respective zone 28 relative to the personal vehicle 12. The cameras 26 comprise a front camera 30 coupled to a forward facing surface 32 of the rear view mirror 16. The cameras 26 comprise a rear camera 34 coupled to the personal vehicle 12 and facing out of the rear window 18 of the personal vehicle 12. The cameras 26 comprise a pair of side cameras 36. Each of the side cameras 36 is coupled to a respective interior surface 38 of an associated one of the doors 20 of the personal vehicle 12 wherein each of the side cameras 36 faces inwardly into the interior 14 of the personal vehicle 12. Each of a plurality of wires 40 couples an associated one of the cameras 26 to the video storage unit 24.

An activation mechanism 42 is operationally coupled to the video storage unit 24 wherein the video storage unit 24 records and stores video images from the cameras 26 upon manipulation of the activation mechanism 42. The activation mechanism 42 is a button 44 extrinsic relative to the video recording unit 24. The activation mechanism 42 is placed in a concealed position within the interior 14 of the personal vehicle 12 and accessible to a driver of the personal vehicle 12.

The device 10 comprises a plurality of mounting supports 46. Each mounting support 46 has a flat surface 48 couplable to the personal vehicle 12. Each camera 26 is coupled to an associated one of the mounting supports 46. Each mounting support 46 has a perimeter wall 50 extending from the flat surface 48. Each perimeter wall 50 has interior threading 52. Each camera 26 comprises a housing 54 having a connecting section 56. Each connecting section 56 is cylindrical having exterior threading 58 complementary to the interior threading 52 of the mounting support 46. Thus, each camera 26 is threadedly coupled to the associated mounting support 46. Each camera 26 has an extension section 60 coupled to and extending from the connecting section 56. The extension section 60 is also cylindrical. The extension section 60 is linearly aligned with the connecting section 56 and has a radius less than a radius of the connecting section 56.

In use, the cameras 26 are positioned as described above. When a driver of the vehicle 12 becomes aware of impending interaction with law enforcement or other persons while in the vehicle 12, the driver manipulates the activation mechanism 42. The video storage unit 24 then stores subsequent activity monitored by the cameras 26 in the form of video retrievable at a later time for evidentiary purposes should the need arise.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A personal vehicle video recording device for recording video in and around a personal vehicle, the device comprising:
   a video storage unit configured for coupling to the personal vehicle;
   a plurality of cameras, each of said cameras being configured for coupling to the personal vehicle, each said camera being positioned to monitor a respective zone relative to the personal vehicle, said cameras including a front camera coupled to a forward facing surface of a rear view mirror, said cameras including a rear camera coupled to the personal vehicle and facing out of a rear window of the personal vehicle, said cameras including a pair of side cameras, each of said side cameras being coupled to a respective interior surface of an associated one of a pair of doors of the personal vehicle wherein each of said side cameras faces inwardly into an interior of the personal vehicle;
   a plurality of wires, each of said wires coupling an associated one of said cameras to said video storage unit; and
   an activation mechanism operationally coupled to said video storage unit wherein said video storage unit records and stores video images from said cameras upon manipulation of said activation mechanism, said activation mechanism being a button extrinsic relative to said video recording unit wherein said activation mechanism is configured for being positioned in a concealed position within the personal vehicle and accessible to a driver of the personal vehicle;
   a plurality of mounting supports, each said mounting support having a flat surface wherein said mounting support is configured for coupling to a surface of the personal vehicle, each said camera being coupled to an associated one of said mounting supports, each said mounting support having a perimeter wall extending from said flat surface, each said perimeter wall having interior threading; and
   each said camera comprising a housing, said housing having a connecting section, each said connecting section being cylindrical, each said connecting section having exterior threading complementary to said interior threading of said mounting support wherein each said camera is threadedly coupled to said associated mounting support, each said camera having an extension section coupled to and extending from said connecting section, said extension section being cylindrical, said extension section being linearly aligned with said connecting section, said extension section having a radius less than a radius of said connecting section.

2. A personal vehicle video recording device comprising:
   a personal vehicle having an interior, a rear view mirror, a rear window, and a pair of doors, each of said doors being positioned on an associated side of said personal vehicle;
   a video storage unit coupled to said personal vehicle such that said video storage unit is concealed from being viewed when looking into said interior of said personal vehicle;
   a plurality of cameras, each of said cameras being coupled to the personal vehicle, each said camera being positioned to monitor a respective zone relative to the personal vehicle, said cameras comprising a front camera coupled to a forward facing surface of said rear view mirror, said cameras comprising a rear camera coupled to said personal vehicle and facing out of said rear window of said personal vehicle, said cameras comprising a pair of side cameras, each of said side cameras being coupled to a respective interior surface of an associated one of said doors of said personal vehicle wherein each of said side cameras faces inwardly into said interior of said personal vehicle;
   a plurality of wires, each of said wires coupling an associated one of said cameras to said video storage unit;
   an activation mechanism operationally coupled to said video storage unit wherein said video storage unit records and stores video images from said cameras upon manipulation of said activation mechanism, said activation mechanism being a button extrinsic relative to said video recording unit, said activation mechanism being in a concealed position within said interior of said personal vehicle and accessible to a driver of the personal vehicle;
   a plurality of mounting supports, each said mounting support having a flat surface couplable to said personal vehicle, each said camera being coupled to an associated one of said mounting supports, each said mounting support having a perimeter wall extending from said flat surface, each said perimeter wall having interior threading; and
   each said camera comprising a housing, said housing having a connecting section, each said connecting section being cylindrical, each said connecting section having exterior threading complementary to said interior threading of said mounting support wherein each said camera is threadedly coupled to said associated mounting support, each said camera having an extension section coupled to and extending from said connecting section, said extension section being cylindrical, said extension section being linearly aligned with said connecting section, said extension section having a radius less than a radius of said connecting section.

* * * * *